United States Patent
Inoue et al.

(10) Patent No.: US 10,704,113 B2
(45) Date of Patent: Jul. 7, 2020

(54) GRAIN ORIENTED ELECTRICAL STEEL SHEET AND PRODUCTION METHOD THEREFOR

(71) Applicant: JFE Steel Corporation, Tokyo (JP)

(72) Inventors: Hirotaka Inoue, Tokyo (JP); Shigehiro Takajo, Tokyo (JP); Seiji Okabe, Tokyo (JP)

(73) Assignee: JFE Steel Corporation, Tokyo (JP)

(*) Notice: Subject to any disclaimer, the term of this patent is extended or adjusted under 35 U.S.C. 154(b) by 355 days.

(21) Appl. No.: 15/112,476

(22) PCT Filed: Jan. 8, 2015

(86) PCT No.: PCT/JP2015/050321
§ 371 (c)(1),
(2) Date: Jul. 19, 2016

(87) PCT Pub. No.: WO2015/111434
PCT Pub. Date: Jul. 30, 2015

(65) Prior Publication Data
US 2016/0333435 A1 Nov. 17, 2016

(30) Foreign Application Priority Data
Jan. 23, 2014 (JP) .................................. 2014-010131

(51) Int. Cl.
*H01F 1/16* (2006.01)
*C21D 8/12* (2006.01)
(Continued)

(52) U.S. Cl.
CPC ........ *C21D 8/1294* (2013.01); *B23K 15/0006* (2013.01); *B23K 26/0006* (2013.01);
(Continued)

(58) Field of Classification Search
CPC .............................. C21D 8/1294; H01F 1/16
(Continued)

(56) References Cited

U.S. PATENT DOCUMENTS

| 4,293,350 A | 10/1981 | Ichiyama et al. |
| 4,552,596 A * | 11/1985 | Ichiyama ............. C21D 8/1294 148/308 |

(Continued)

FOREIGN PATENT DOCUMENTS

| CN | 103025903 | 4/2013 |
| CN | 103069035 | 4/2013 |

(Continued)

OTHER PUBLICATIONS

NPL: translation of JP-07090385A, Apr. 1995 (Year: 1995).*
(Continued)

*Primary Examiner* — Jie Yang
(74) *Attorney, Agent, or Firm* — DLA Piper LLP (US)

(57) ABSTRACT

A magnetic domain refining treatment is performed by dividing a surface of a steel sheet into a plurality of regions in a widthwise direction, disposing a laser irradiation apparatus or an electron beam irradiation apparatus in each of the regions, and forming beam-irradiated regions through beam irradiation, wherein beams are irradiated so that a nature of a juncture between beam-irradiated regions satisfies $0 \leq \alpha \leq 0.3 \times a$ and $-1.2 \times a + 0.02 \times w - 0.5 \times \alpha - 6.5 \leq \beta \leq -0.13 \times a - 200 \times (1/w) + 5.4$ when TD spacing $\beta$ at the juncture between the beam-irradiated regions is −3 to 0 mm, whereby a grain oriented electrical steel sheet having an excellent iron loss property is produced in a good productivity.

2 Claims, 4 Drawing Sheets

Width of steel sheet: 100 mm

(51) Int. Cl.
- *C22C 38/02* (2006.01)
- *B23K 15/00* (2006.01)
- *B23K 26/00* (2014.01)
- *C22C 38/00* (2006.01)
- *B23K 26/352* (2014.01)
- *B23K 101/18* (2006.01)
- *B23K 103/04* (2006.01)
- *C22C 38/60* (2006.01)
- *B23K 103/00* (2006.01)
- *C22C 38/04* (2006.01)
- *C22C 38/42* (2006.01)
- *C22C 38/44* (2006.01)

(52) U.S. Cl.
CPC ........... *B23K 26/352* (2015.10); *C22C 38/00* (2013.01); *C22C 38/02* (2013.01); *H01F 1/16* (2013.01); *B23K 2101/18* (2018.08); *B23K 2103/04* (2018.08); *B23K 2103/50* (2018.08); *C22C 38/008* (2013.01); *C22C 38/04* (2013.01); *C22C 38/42* (2013.01); *C22C 38/44* (2013.01); *C22C 38/60* (2013.01)

(58) Field of Classification Search
USPC ........................................................ 148/112
See application file for complete search history.

(56) References Cited

U.S. PATENT DOCUMENTS

| | | | | |
|---|---|---|---|---|
| 9,330,839 | B2 * | 5/2016 | Omura | ................. C21D 8/1255 |
| 2013/0130043 | A1 | 5/2013 | Omura et al. | |
| 2013/0143050 | A1 | 6/2013 | Omura et al. | |
| 2014/0312009 | A1 | 10/2014 | Okabe et al. | |
| 2014/0352849 | A1 | 12/2014 | Suehiro et al. | |
| 2014/0360629 | A1 | 12/2014 | Inoue et al. | |

FOREIGN PATENT DOCUMENTS

| | | | |
|---|---|---|---|
| EP | 2 602 344 | | 6/2013 |
| JP | 57-2252 | B2 | 1/1982 |
| JP | 58-19440 | A | 2/1983 |
| JP | 59-23823 | A | 2/1984 |
| JP | 6-116654 | A | 4/1994 |
| JP | 6-72266 | B2 | 9/1994 |
| JP | 07090385 | A * | 4/1995 |
| WO | 2012/164702 | A1 | 12/2012 |
| WO | 2012/164746 | A1 | 12/2012 |
| WO | 2013/099219 | | 7/2013 |
| WO | 2013/099258 | | 7/2013 |
| WO | 2013/099272 | | 7/2013 |

OTHER PUBLICATIONS

Japanese Office Action dated Jul. 12, 2017, of corresponding Japanese Application No. 2015-558792, along with a Concise Statement of Relevance of Office Action in English.

Chinese Office Action dated Sep. 14, 2017, of corresponding Chinese Application No. 201580005288.4, along with a Search Report in English.

Supplementary European Search Report dated Dec. 15, 2016, of corresponding European Application No. 15740472.4.

Japanese Office Action dated Dec. 27, 2016, of corresponding Japanese Application No. 2015-558792, along with a Concise Statement of Relevance of Office Action in English.

* cited by examiner

GRAIN ORIENTED ELECTRICAL STEEL SHEET AND PRODUCTION METHOD THEREFOR

TECHNICAL FIELD

This disclosure relates to a grain oriented electrical steel sheet and a method of producing the same and, more particularly, to a grain oriented electrical steel sheet having an excellent iron loss property as being subjected to magnetic domain refining treatment and a method of producing the same.

BACKGROUND

Since grain oriented electrical steel sheets are mainly used as an iron core material for transformers and motors, it is strongly demanded to be excellent in the magnetic properties, particularly excellent in iron loss property (low in iron loss). To improve the iron loss property, it is effective to highly align secondary recrystallized grains in a steel sheet product into {110}<001> orientation (so-called Goss orientation) or to reduce impurities.

However, there is a limit in the effect of improving iron loss by the abovementioned crystal orientation control or impurity reduction. To this end, there has been developed a method of reducing the iron loss by introducing non-uniformity into the steel sheet surface through a physical means to subdivide a magnetic domain width, or so-called "magnetic domain refining" method. For example, JP S57-002252 B proposes a technique wherein a laser is irradiated to a final product sheet to introduce a high dislocation density region into a surface layer of the steel sheet to thereby narrow a magnetic domain width and reduce an iron loss. JP H06-072266 B proposes a technique of controlling a magnetic domain width by electron beam irradiation.

When the laser irradiation or electron beam irradiation (hereinafter referred to as "beam irradiation" simply, and an irradiation apparatus therefor is referred to as "beam irradiation apparatus") is performed onto the steel sheet surface, it is difficult to irradiate the full width of the steel sheet with a single beam irradiation apparatus due to restriction on a convergence or an irradiation rate of beam, i.e. a rate of scanning beam onto the steel sheet surface (hereinafter referred to as "scanning rate" simply). In such a case, irradiation is performed by disposing a plurality of beam irradiation apparatuses in a widthwise direction of the sheet so that a displacement is necessarily caused in a "juncture" between regions covered by the individual beam irradiation apparatuses (hereinafter referred to as "beam-irradiated region"). Two kinds of discontinuities (hereinafter also referred to as "displacement") exist in the juncture, one of which is a displacement in the rolling direction. Such a displacement is a so-called "incoherent" phenomenon that when two beam irradiation apparatuses are not controlled in synchronization, two irradiated regions are shifted to each other in the longitudinal direction of the steel sheet (rolling direction: RD direction). Another displacement is a displacement in a widthwise direction of the sheet (TD direction). Moreover, the displacement in the widthwise direction of the sheet may have two adjacent beam-irradiated regions overlapping in the widthwise direction and the two regions being separated without overlapping.

To minimize the discontinuities of the irradiated regions in the longitudinal and widthwise directions, or the quantity of the displacement, it is necessary to properly set the irradiated region of the each beam irradiation apparatus and simultaneously control the adjacent beam irradiation apparatuses in synchronization. Even if the setting at an initial state goes smoothly, meandering of the steel sheet is caused during continuous irradiation of the steel sheet or an error is caused in the beam-irradiated region due to the aging degradation of an optical system, whereby the displacement may be caused in the beam-irradiated region at the juncture in the longitudinal direction and/or the widthwise direction to render the beam-irradiated regions into the discontinuity. If such a discontinuity exists in the steel sheet, deterioration of the iron loss property is caused.

As a method of resolving such a discontinuity, for example, JP H06-116654 A discloses a beam irradiation method wherein a meandering amount of a steel strip is detected to change a scanning range of beam irradiation. Also, there is a method of sensing the beam-irradiated region in some way to feedback control the beam-irradiated region.

In the conventional method of JP H06-116654 A, however, an additional installation is required or the scanning rate is delayed associated therewith so that productivity is largely blocked.

It could therefore be helpful to provide a grain oriented electrical steel sheet having an excellent iron loss property and a method of producing the steel sheet in a good productivity.

SUMMARY

We studied the influence of a nature of a discontinuous juncture between the beam-irradiated regions upon the iron loss property. We found that even if the displacement is caused, the increase of the iron loss can be suppressed to a small value by controlling the nature at the juncture between the adjacent beam-irradiated regions to a specified range and the magnetic domain refining treatment can be performed in a good productivity.

We thus provide a grain oriented electrical steel sheet having a plurality of beam-irradiated regions formed by performing laser irradiation or electron beam irradiation onto a steel sheet surface in a widthwise direction of the steel sheet to introduce strain in a linear shape or in a dot sequence shape at an angle of not more than 30° with respect to the widthwise direction thereinto, characterized in that a nature of a juncture between the beam-irradiated regions satisfies equations (1) and (2):

$$0 \leq \alpha \leq 0.3 \times a \quad (1)$$

$$-1.2 \times a + 0.02 \times w - 0.5 \times \alpha - 6.5 \leq \beta \leq -0.13 \times a - 200 \times (1/w) + 5.4 \quad (2)$$

wherein
- $\alpha$: RD spacing (mm) at a juncture between beam-irradiated regions
- $\beta$: TD spacing (mm) at a juncture between beam-irradiated regions
- $a$: beam spacing (mm)
- $w$: average width of magnetic domain discontinuous part (μm).

Further, we provide a method of producing the grain oriented electrical steel sheet, characterized in that a surface of a steel sheet is divided into plural regions in a widthwise direction of the sheet and subjected to a magnetic domain refining treatment by disposing a laser irradiation apparatus or an electron beam irradiation apparatus on each of the regions and irradiating beams to form a beam-irradiated region, wherein irradiation of beams is performed by setting a TD spacing $\beta$ at a juncture between the beam-irradiated regions to a range of −3 to 0 mm.

An increase of iron loss can be suppressed by controlling discontinuities (displacements) in a rolling direction and a widthwise direction at a juncture between adjacent beam-irradiated regions to adequate ranges. Hence, it is made possible to produce a grain oriented electrical steel sheet having an excellent iron loss property in a good productivity.

DETAILED DESCRIPTION

Figure 1:
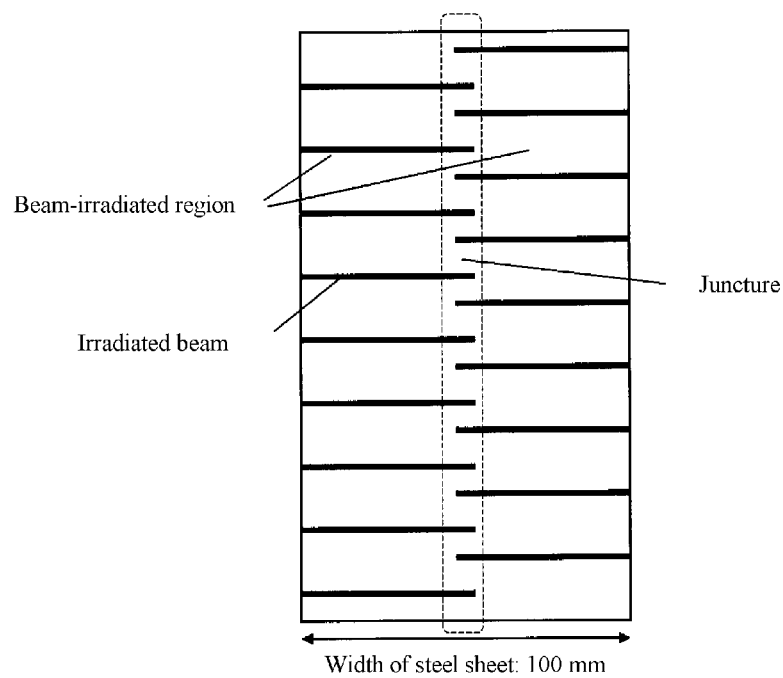
FIG. 1 is a schematic view illustrating a sample used in an experiment.

We measured iron loss on various steel sheets having a beam spacing a of 5 mm (constant) and a different nature of a juncture of examining the influence of a discontinuity (displacement) at a juncture between adjacent beam-irradiated-regions upon an iron loss property. Concretely, a sample is prepared by variously changing a displacement quantity in a longitudinal direction and a displacement quantity in a widthwise direction at a juncture between two beam-irradiated regions formed on a widthwise central portion of a steel sheet of 100 mm in width through electron beam irradiation as shown in FIG. 1. Then iron loss $W_{17/50}$ thereof is measured with a single sheet tester. In this case, electron beam irradiation conditions are an acceleration voltage of 60 kV, a beam current of 9.5 mA and a scanning rate of 30 m/s.

Figure 2:
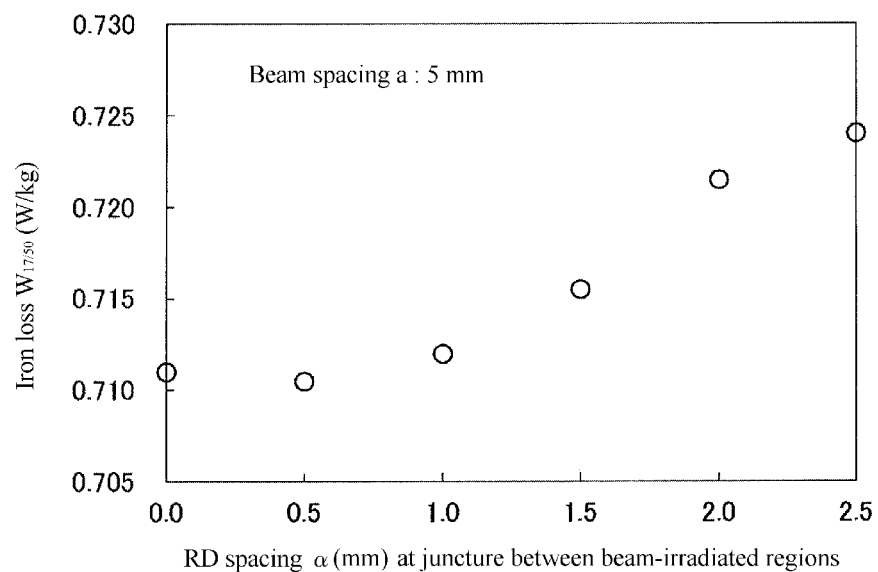
FIG. 2 is a graph showing a relationship between RD spacing α at a juncture between adjacent beam-irradiated regions and iron loss $W_{17/50}$.
Figure 3:
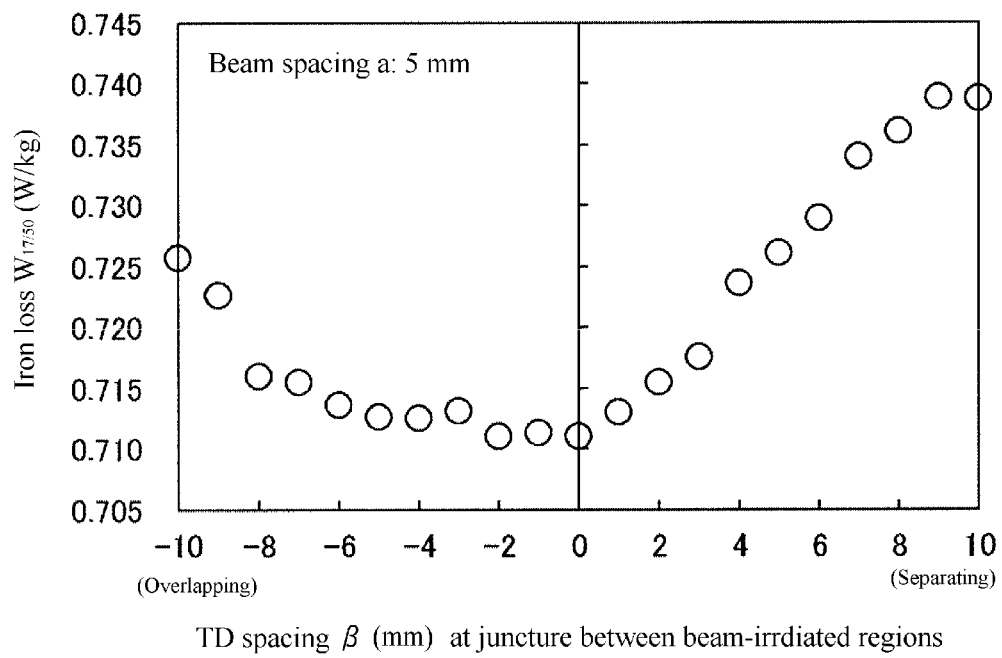
FIG. 3 is a graph showing a relationship between TD spacing β at a juncture between adjacent beam-irradiated regions and iron loss $W_{17/50}$.

FIG. 2 shows the relationship between displacement quantity in a longitudinal direction (RD direction) at a juncture between adjacent beam-irradiated regions (this quantity is called as "RD spacing α" hereinafter). Moreover, two RD spacings exist in the same juncture, but a narrow spacing is adopted and an iron loss $W_{17/50}$. FIG. 3 shows the relationship between displacement quantity in a widthwise direction (TD direction) at a juncture between adjacent beam-irradiated regions (this quantity is called as "TD spacing β" hereinafter, wherein an an overlapping case is "minus (−)" and a separating case is "plus (+)") and an iron loss $W_{17/50}$.

From these figures, the following are shown:

(1) When the adjacent beam-irradiated regions are shifted in the longitudinal direction (α>0), iron loss is increased as compared to when the beam-irradiated regions are continuous.

(2) When both the adjacent beam-irradiated regions are overlapped (β<0) and separated (β>0) at the juncture in the widthwise direction, iron loss is increased as compared to when the beam-irradiated regions are continuous (β=0). However, the increment of iron loss is larger in the separating case.

(3) On the other hand, when the discontinuity of the beam-irradiated regions is within a certain range in the widthwise direction and the longitudinal direction, the increment of the iron loss is small, which is not adversely affected by the discontinuity at the juncture.

As mentioned above, when the beam-irradiated regions are discontinuous at the juncture, the iron loss is increased, whereas if the degree of the discontinuity (displacement quantity) is within a given range, the iron loss is not increased. Therefore, when the displacement quantity can be controlled to a given range, it can be seen that grain oriented electrical steel sheets having a low iron loss can be produced in a good productivity even if the discontinuous part cannot be eliminated completely.

Next, we examined causes of deteriorating the iron loss property due to the discontinuity at the juncture between the beam-irradiated regions and found the following when the iron loss measured in the above experiment is separated into hysteresis loss and eddy current loss. When the iron loss is separated, iron loss in direct current excitation is defined as hysteresis loss and a difference between iron loss in alternate current excitation and iron loss in direct current excitation is defined as eddy current loss.

(1) When the adjacent beam-irradiated regions are shifted in the longitudinal direction (α>0), hysteresis loss is increased as compared to when the beam-irradiated regions are continuous (α=0). This is believed to be due to the fact that strain is unevenly introduced by displacement to locally complicate magnetization process and, hence, the hysteresis loss is increased.

(2) When the adjacent beam-irradiated regions are overlapped in the widthwise direction (β<0), the hysteresis loss is increased as compared to when the beam-irradiated regions are continuous (β=0). This is believed to be due to the fact that when the beam-irradiated regions overlap, strain is excessively introduced in the overlapped portion and magnetic permeability in such a portion becomes small and, hence, magnetic permeability as a whole of the steel sheet becomes non-uniform and small to thereby increase hysteresis loss.

(3) When the beam-irradiated regions are separated in the widthwise direction (β>0), the eddy current loss is increased as compared to when the beam-irradiated regions are continuous (β=0). This is believed to be due to the fact that when the beam-irradiated regions are separated, magnetic domain refining is not performed in the separated portion and decrease of the magnetic domain width is not caused and the eddy current loss is increased.

From the above behavior of deteriorating the iron loss property, it is anticipated that the increment of the iron loss is changed even when a longitudinal spacing of beam irradiated or an introduced thermal strain quantity represented by an average width w of magnetic domain discontinuous part (see FIG. 4) is varied. Further, when the discontinuity is caused at the juncture, it is anticipated that the displacement quantity of the beam-irradiated regions in the longitudinal direction or widthwise direction of the steel sheet capable of suppressing the increase of iron loss is varied from the range of FIG. 2 or 3.

Samples are prepared by variously changing beam spacing a and average width w of magnetic domain discontinuous part in addition to the RD spacing α and TD spacing β, and a range of displacement quantity between beam-irradiated regions in the longitudinal direction and widthwise direction of the steel sheet capable of suppressing the increase of iron loss is reexamined. In this experiment, samples are prepared in the same way as in the aforementioned experiment and iron loss $W_{17/50}$ thereof is measured, from which are determined ranges of displacement quantity in the longitudinal direction (RD spacing α) and displacement quantity in the widthwise direction (TD spacing β) between beam-irradiated regions within a range of the increment of iron loss not exceeding 0.01 W/kg. As a result, the grain oriented electrical steel sheets having an excellent iron loss property wherein the increment of iron loss $W_{17/50}$ at the juncture is not more than 0.01 W/kg, or is not influenced by the displacement of the juncture are obtained when the nature of the juncture between the adjacent beam-irradiated regions satisfies equations (1) and (2):

$$0 \leq \alpha \leq 0.3 \times a \tag{1}$$

$$-1.2 \times a + 0.02 \times w - 0.5 \times \alpha - 6.5 \leq \beta \leq -0.13 \times a - 200 \times (1/w) + 5.4 \tag{2}$$

wherein
- α: RD spacing (mm) at a juncture between beam-irradiated regions,
- β: TD spacing (mm) at a juncture between beam-irradiated regions,
- a: beam spacing (mm), and
- w: average width of magnetic domain discontinuous part (μm).

The beam-irradiated region and the factors α, β, a and w will be described below. Beam-irradiated region The beam-irradiated region means a region irradiated by laser or electron beam. When a beam output is large, a coating formed on the steel sheet surface is damaged by beam irradiation to form an irradiated trace so that the beam-irradiated region can be simply distinguished by visual observation or with a microscope. If the irradiated trace is not caused, a magnetic domain structure parallel to the rolling direction is interrupted or becomes discontinuous in a region irradiated by beams so that the beam-irradiated region can be distinguished by visualizing with a magnetic domain observing means such as the Bitter method or the like.

α: RD spacing at a juncture between beam-irradiated regions (mm)

A displacement quantity in the rolling direction at the juncture between beam-irradiated regions is called RD spacing. A narrower spacing among two RD spacings at the same juncture is adopted as "RD spacing α" (see FIG. 5). Also, when the RD spacing at the juncture between the beam-irradiated regions is not made constant by moving the beam spacing in the longitudinal direction, RD spacing is measured in 5 sites at an interval of 500 mm in the widthwise direction and an average of the measured values is adopted. Further, when plural junctures are existent in the widthwise direction of the steel sheet, an average value thereof is adopted.

β: TD spacing at a juncture between beam-irradiated regions (mm)

Figure 5:
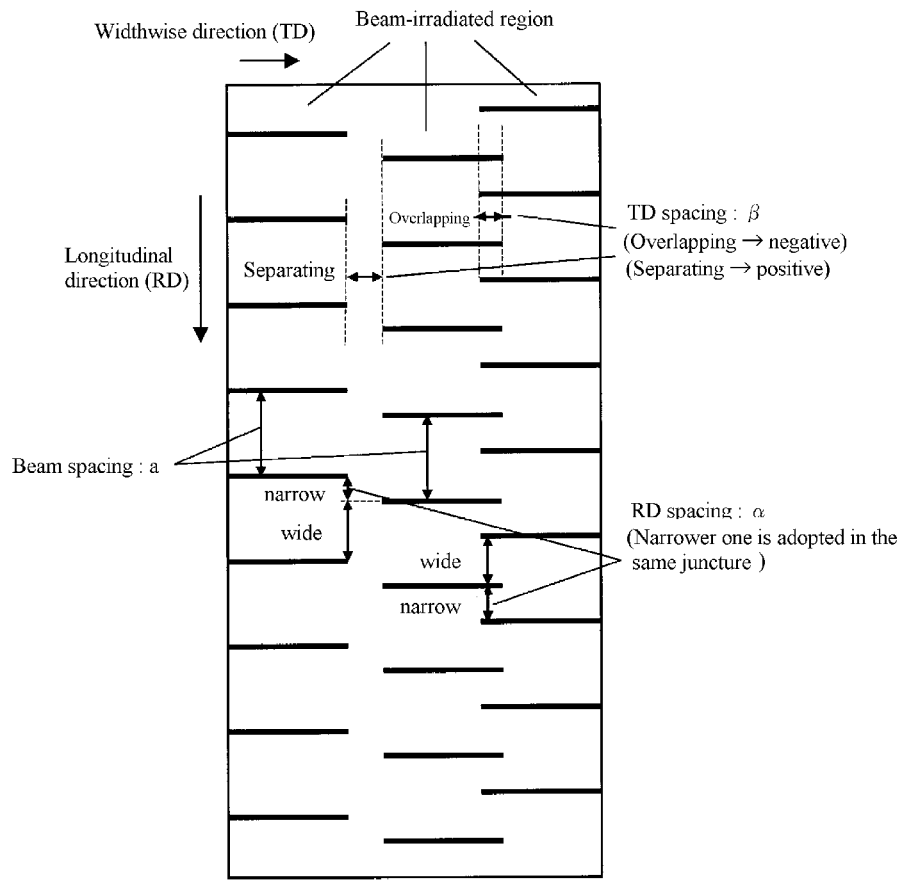
FIG. 5 is a view illustrating factors for specifying a juncture between adjacent beam-irradiated regions.

As mentioned above, the displacement quantity in the widthwise direction at the juncture between beam-irradiated regions is called "TD spacing β", wherein when the beam-irradiated regions overlap with each other is "minus (−)" and when the beam-irradiated regions are separated from each other is "plus (+)" (see FIG. 5). When the TD spacing is not made constant by changing the width of the beam-irradiated region, TD spacing is measured at 5 sites in 500 mm of the longitudinal direction and an average of the measured values is defined as TD spacing β. When plural junctures exist in the widthwise direction of the steel sheet, it is judged whether or not equation (2) is satisfied by β value of each of the junctures without averaging. When values shifted to plus side and values shifted to minus side are averaged simply or absolute values thereof are averaged, there is a problem that the TD spacing β making the iron loss value to an adequate range cannot be evaluated correctly because the effect of plus side and the effect of minus side are different.

Moreover, when there is no RD spacing at the juncture due to complete overlapping of the two beam-irradiated regions, it may be quite difficult to determine the TD spacing β. In such a case, thermal strain quantity becomes large and the width of the magnetic domain discontinuous part becomes wide in the place of overlapping the beam-irradiated traces so that TD spacing β is measured by defining a zone where the width of magnetic domain discontinuous part is widened by not less than 20% of an average value of beam-irradiated regions not overlapped in the beam-irradiated trace as an overlapping zone.

a: beam spacing (mm)

It is defined as an interval of irradiated beams at the beam-irradiated region in the longitudinal direction (see FIG. 5). If the beam spacing is not constant in the same beam-irradiated region, it is measured at 5 sites in 500 mm of the longitudinal direction and an average of the measured values is adopted.

w: average width of magnetic domain discontinuous part (μm)

Figure 4:
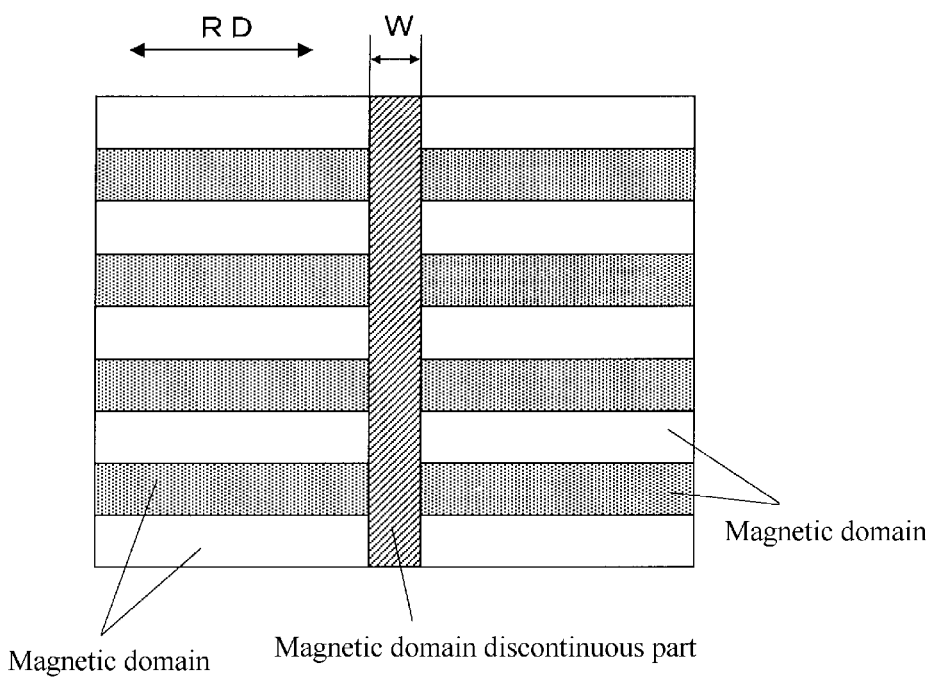
FIG. 4 is a view illustrating an average width w of a magnetic domain discontinuous part.

The magnetic domain discontinuous part is a place where the magnetic domain structure is locally disturbed by introduction of thermal strain through beam irradiation, which means a portion where the magnetic domain structures parallel to the rolling direction are interrupted or become discontinuous as shown in FIG. 4. This can be measured by observing magnetic domains through the Bitter method. Since the width is not necessarily constant in the beam-irradiated region, it is measured at 5 or more sites in 100 mm of the beam irradiating direction, and an average of the measured values is defined as a width of magnetic domain discontinuous part in the irradiated beam. Further, it is measured at 5 or more beams in 500 mm of the longitudinal direction and an average of the measured values is defined as an average width of magnetic domain discontinuous part.

The two equations defining the nature of the juncture between the beam-irradiated regions will be described below.

$$0 \leq \alpha \leq 0.3 \times a \tag{1}$$

When the adjacent beam-irradiated regions are shifted in the longitudinal direction, strain is non-uniformly introduced into the juncture. Hence, the regular magnetic domain structure is locally disturbed to increase hysteresis loss. In this case, as the beam spacing a becomes narrow, thermal strain quantity per unit area through beam irradiation becomes large so that it is anticipated that the increment of hysteresis loss by the non-uniform introduction of the strain becomes large.

Figure 6:
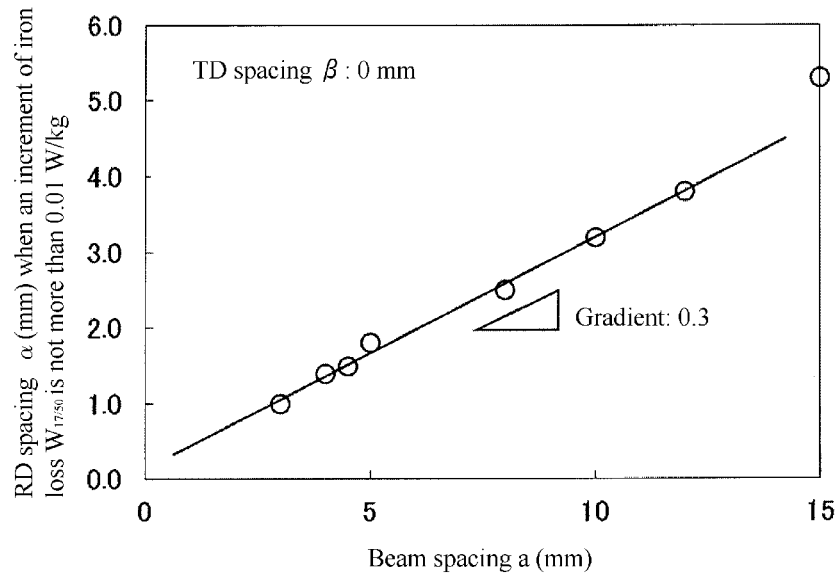
FIG. 6 is a graph showing a relationship between beam spacing a when an increment of iron loss $W_{17/50}$ does not exceed 0.01 W/kg and RD spacing α.

FIG. 6 shows results that RD spacing α and beam spacing a are varied under a condition that TD spacing β at a juncture between adjacent beam-irradiated regions is set to 0 mm (constant) and, thereafter, RD spacing α when an increment of iron loss $W_{17/50}$ does not exceed 0.01 W/kg is measured at each beam spacing a. In this case, conditions irradiating electron beams are acceleration voltage of 60 kV, beam current of 9.5 mA and scanning rate of 30 m/s. As seen from this figure, acceptable RD spacing α becomes small as the beam spacing a becomes narrow, and when RD spacing α is not more than (0.3×a), or satisfies equation (1), the increment of iron loss $W_{17/50}$ does not exceed 0.01 W/kg and the increase of iron loss can be suppressed.

$$-1.2 \times a + 0.02 \times w - 0.5 \times a - 6.5 \leq \beta \leq -0.13 \times a - 200 \times (1/w) + 5.4 \quad (2)$$

First, the effect of beam spacing a will be described below.

Figure 7A:
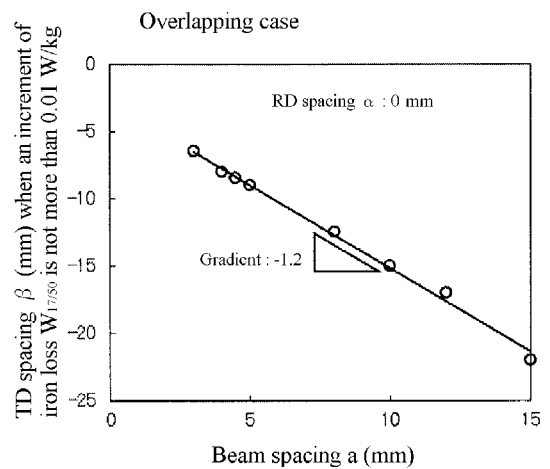
FIGS. 7(a) and 7(b) are graphs showing a relationship between beam spacing a when an increment of iron loss $W_{17/50}$ does not exceed 0.01 W/kg and TD spacing β.
Figure 7B:
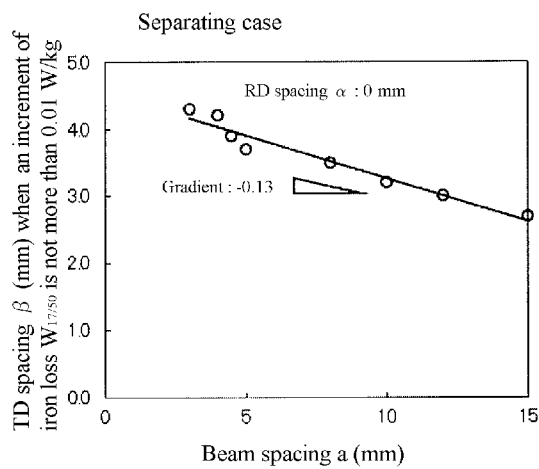

FIGS. 7(a) and 7(b) show results that TD spacing β and beam spacing a are varied under a condition that RD spacing α at a juncture between beam-irradiated regions is set to 0 mm (constant) and, thereafter, TD spacing β when an increment of iron loss $W_{17/50}$ does not exceed 0.01 W/kg is measured at each beam spacing a. Moreover, conditions irradiating electron beams are acceleration voltage of 60 kV, beam current of 9.5 mA and scanning rate of 30 m/s similarly in FIG. 6.

When the beam-irradiated regions overlap at the juncture in the widthwise direction (β<0), as the beam spacing a becomes narrow, thermal strain quantity introduced per unit area through beam irradiation becomes large so that the effect of increasing hysteresis loss in overlapping beams is promoted to make the increment of iron loss large. That is, it is believed that the acceptable overlapping quantity in the widthwise direction becomes larger as the beam spacing a becomes wider. The influence coefficient (gradient) thereof is estimated to be −1.2 from observation results of FIG. 7(a).

On the other hand, when the beam-irradiated regions are separated at the juncture (β>0), thermal strain quantity introduced by beam irradiation becomes small. Hence, it is required to increase the thermal strain quantity introduced for supplementing magnetic domain refining effect so that it is believed that acceptable quantity of empty becomes large as the beam spacing becomes narrow. The influence coefficient (gradient) thereof is estimated to be −0.13 from observation results of FIG. 7(b).

The effect of the average width w of the magnetic domain discontinuous part will be described below.

Figure 8A:
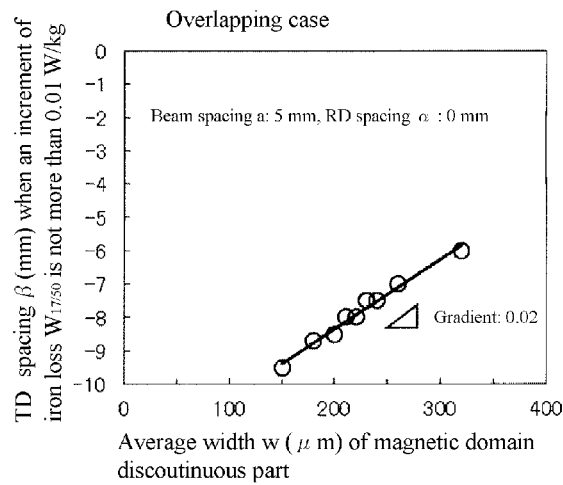
FIGS. 8(a) and 8(b) are graphs showing a relationship between average width w of magnetic domain discontinuous part when an increment of iron loss $W_{17/50}$ does not exceed 0.01 W/kg and TD spacing β.
Figure 8B:
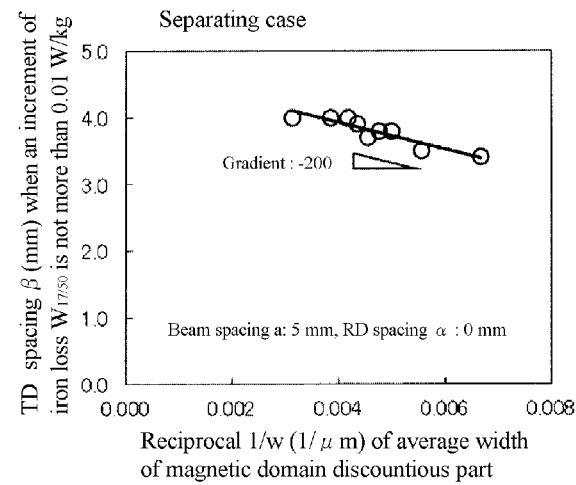

The average width w of the magnetic domain discontinuous part is an indication representing the thermal strain quantity introduced in the beam-irradiated region. When w is large, the thermal strain quantity introduced becomes large and the hysteresis loss becomes large. FIGS. 8(a) and 8(b) show results that TD spacing β and average width w of magnetic domain discontinuous part are variously changed under a condition that beam spacing a is set to 5 mm and RD spacing α is set to 0 mm (constant) and, thereafter, TD spacing β when an increment of iron loss $W_{17/50}$ does not exceed 0.01 W/kg is measured at each w. Moreover, conditions irradiating electron beams are acceleration voltage of 60 kV, beam current of 9.5 mA and scanning rate of 30 m/s similarly in FIG. 6.

When the beam-irradiated regions overlap at the juncture in the widthwise direction (β<0), as the average width w of magnetic domain discontinuous part becomes large, thermal strain quantity introduced becomes large so that the effect of increasing hysteresis loss in overlapping beams is promoted to make the increment of iron loss large. That is, it is believed that the acceptable overlapping quantity becomes larger as the average width w of magnetic domain discontinuous part becomes narrower. The influence coefficient (gradient) thereof is estimated to be 0.02 mm/μm from observation results of FIG. 8(a).

On the other hand, when the beam-irradiated regions are separated at the juncture (β>0), it is required to increase the thermal strain quantity introduced to supplement magnetic domain refining effect so that acceptable quantity of empty becomes large as the average width w of the magnetic domain discontinuous part becomes large. Since the iron loss is roughly decreased inversely proportional to w by magnetic domain refining, acceptable quantity thereof is believed to be proportional to reciprocal of w (1/w). The influence coefficient (gradient) to 1/w is estimated to be −200 μm·mm from observation results of FIG. 8(b).

Finally, the effect of RD spacing α representing displacement quantity in the longitudinal direction at the juncture between beam-irradiated regions will be described below.

Figure 9A:
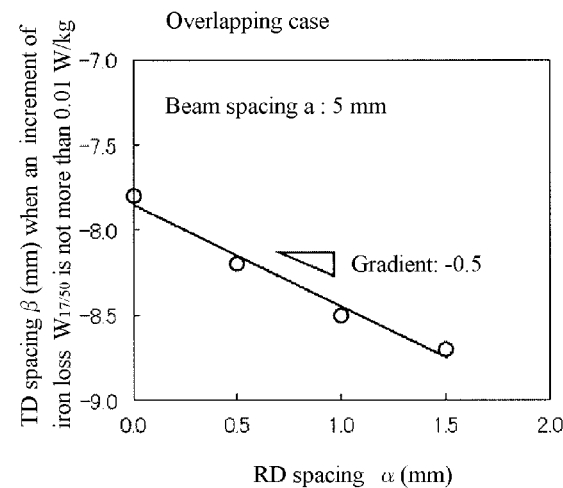
FIGS. 9(a) and 9(b) are graphs showing a relationship between RD spacing α when an increment of iron loss $W_{17/50}$ does not exceed 0.01 W/kg and TD spacing β.
Figure 9B:
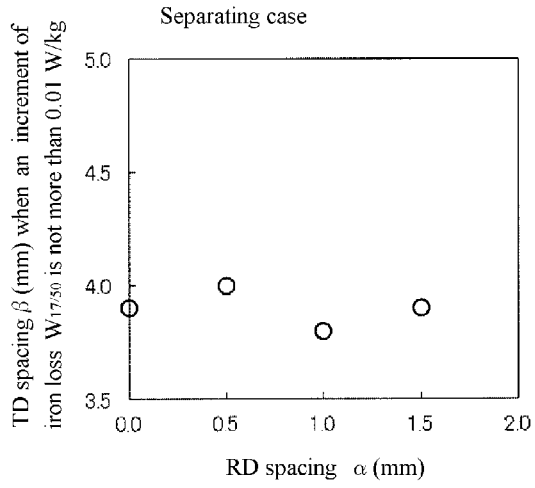

FIGS. 9(a) and 9(b) show results that TD spacing β and RD spacing α are variously changed under a condition that beam spacing a is set to 5 mm, and thereafter TD spacing β when an increment of iron loss $W_{17/50}$ does not exceed 0.01 W/kg is measured at each a. Moreover, conditions irradiating electron beams are acceleration voltage of 60 kV, beam current of 9.5 mA and scanning rate of 30 m/s similarly in FIG. 6.

Even when the beam-irradiated regions overlap at the juncture in the widthwise direction (β<0), if the RD spacing α is large, the introduction of thermal strain is mitigated so that it is believed that the acceptable overlapping quantity becomes large. The influence coefficient thereof (gradient) is estimated to be −0.5 from observation results of FIG. 9(a). On the other hand, when the beam-irradiated regions are separated at the juncture in the widthwise direction (β>0), the influence is small and may be ignored.

Finally, when a specimen as a whole is estimated by overlapping these effects to each other, it is estimated to be −6.5 at an overlapping side of the beam-irradiated regions at the juncture in the widthwise direction (β<0) and 5.4 at a separating side thereof (β>0). As seen from these results, TD spacing β is necessary to be controlled to satisfy equation (2) so that the increment of iron loss $W_{17/50}$ does not exceed 0.01 W/kg due to the nature of the juncture.

There will be described a method of reducing displacements in the longitudinal direction and widthwise direction at the juncture between beam-irradiated regions to suppress the increase of iron loss to satisfy equations (1) and (2).

As a method of reducing the displacement quantity at the juncture between the beam-irradiated regions are considered a method of mechanically changing an arranging position of a laser reflecting mirror or an electron gun to adjust a scanning range of beam irradiation and a method of optically or magnetically detecting beam-irradiated region itself to feed-back control the scanning range thereof electrically. There is also a method wherein the beam-irradiated regions are changed in accordance with a meandering quantity of the steel sheet detected or the meandering quantity of the steel sheet itself is made minimum by line control. In the latter case, it is important to control the variation of the displacement quantity to the aforementioned range.

In this case, the acceptable range of the displacement quantity in TD direction (TD spacing β) so that the increment of iron loss $W_{17/50}$ does not exceed 0.01 W/kg is wide at the side of overlapping the beam-irradiated regions (β<0) so that when the beam-irradiated regions overlap within a range of 0-3 mm in the widthwise direction, or TD spacing β is controlled to −3 to 0 mm, the increment of iron loss $W_{17/50}$ can be suppressed to not more than 0.01 W/kg even if meandering of the steel sheet is somewhat caused during the carrying thereof.

As a preferable way of magnetic domain refining treatment is laser irradiation or electron beam irradiation capable of irradiating large energy while reducing beam size.

First, conditions of magnetic domain refining treatment through laser irradiation will be described.

As a kind of laser for laser irradiation can be preferably used a solid-state laser such as YAG laser, fiber laser or the like and a gas laser such as $CO_2$ laser or the like. Also, oscillation form of the laser may be continuous oscillation and pulse oscillation of Q switch type.

An average power P of laser irradiated, a scanning rate V of beam, a beam diameter d and so on are not particularly limited, but it is preferable that heat input of energy per unit length scanning beams (P/V) is more than 10 W·s/m to sufficiently provide a magnetic domain refining effect.

The laser irradiation to the steel sheet may be continued irradiation in a linear shape or irradiation in a dot sequence shape. Also, a dot interval of the irradiation in a dot sequence shape is preferable to be not more than 1.00 mm because the magnetic domain refining effect becomes small as the interval becomes wider.

Next, conditions of the magnetic domain refining treatment through electron beam irradiation will be described.

An acceleration voltage E in the electron beam irradiation, a beam current I and a beam scanning rate V are not particularly limited. However, to sufficiently provide the magnetic domain refining effect, it is preferable that heat input of energy per unit length scanning beams (E×I/V) is more than 6 W·s/m.

A pressure in a working room irradiating electron beams to the steel sheet is desirable to be not more than 2 Pa. If the pressure is higher than the above value, electron beams are irregularly reflected by a residual gas in a pathway ranging from an electron gun to the steel sheet to make the beam vague or attenuate energy in the central portion of the beam to thereby decrease energy applied to the steel sheet. Hence, the magnetic domain refining effect is made small.

Furthermore, the irradiation of electron beams to the steel sheet may be irradiation in a linear shape or in a dot sequence shape. The irradiation in a dot sequence shape can be attained by repeating a process that beam is scanned quickly and stopped at a given time interval and then the beam is irradiated at the stopped position for a given time and thereafter the scanning is started. To attain this process of electron beam irradiation, a deflection voltage of the electron beam may be changed with an amplifier having a large capacity. Moreover, a dot interval of irradiation in a dot sequence shape is preferable to be not more than 0.80 mm because the magnetic domain refining effect becomes small as the interval becomes wider.

In the magnetic domain refining treatment through laser irradiation or electron beam irradiation, the beam spacing a in the rolling direction is not particularly limited as long as equations (1) and (2) are satisfied, but it is preferably 3-15 mm to more enhance the magnetic domain refining effect. Also, an angle of the beam to the widthwise direction (direction perpendicular to the rolling direction) is necessary to be not more than 30°. When the angle exceeds 30°, the magnetic domain refining effect is small and the iron loss is not decreased sufficiently.

There will be described the production method of the grain oriented electrical steel sheet other than the above magnetic domain refining treatment below.

First, a raw steel material used in the production of the grain oriented electrical steel sheet is preferable to have a given chemical composition. Concretely, when an inhibitor is used to cause secondary recrystallization, it is preferable to use a material containing a proper amount of Al and N when using an AlN-based inhibitor or to use a material containing a proper amount of Mn and S and/or Se when using a MnS·MnSe-based inhibitor. Of course, both the inhibitors may be included. In these cases, preferable contents of Al, N, S and Se are Al: 0.01-0.065 mass %, N: 0.005-0.012 mass %, S: 0.005-0.03 mass % and Se: 0.005-0.03 mass %, respectively.

On the contrary, when an inhibitor is not used to cause secondary recrystallization, it is desirable to decrease contents of Al, N, S and Se forming the inhibitor as small as possible. It is preferable to decrease the contents of Al, N, S and Se to Al: not more than 0.0100 mass %, N: not more than 0.0050 mass %, S: not more than 0.0050 mass % and Se: not more than 0.0050 mass %, respectively.

As a fundamental ingredient included in the raw steel material, there are C, Si and Mn other than the ingredients forming the inhibitor, which are preferable to be the following ranges.

C: not more than 0.08 mass %

When C exceeds 0.08 mass %, it is difficult to decrease the content to not more than 0.0050 mass %, which does not cause magnetic aging in a product sheet, in decarburization annealing of the production process. Therefore, C is preferable to be not more than 0.08 mass %. Moreover, even if C is not included, secondary recrystallization is made possible so that the lower limit is not particularly necessary.

Si: 2.0-8.0 mass %

Si is an element effective to increase an electric resistance of steel to decrease iron loss. However, when it is less than 2.0 mass %, sufficient effect of decreasing the iron loss cannot be obtained. On the other hand, when it exceeds 8.0 mass %, the workability is considerably deteriorated and the production is difficult to be performed by rolling and also the magnetic flux density is decreased. Therefore, Si content is preferably 2.0-8.0 mass %.

Mn: 0.005-1.0 mass %

Mn is an element required to improve hot workability of steel. However, when it is less than 0.005 mass %, the improving effect is poor. While when it exceeds 1.0 mass %, the magnetic flux density is decreased. Therefore, Mn content is preferably 0.005-1.0 mass %.

In the raw steel material can be further included one or more selected from Ni: 0.03-1.50 mass %, Sn: 0.01-1.50 mass %, Sb: 0.005-1.50 mass %, Cu: 0.03-3.0 mass %, P: 0.03-0.50 mass %, Cr: 0.03-1.50 mass % and Mo: 0.005-0.10 mass % for the purpose of improving the magnetic properties.

Ni is an element useful to improve a steel structure of a hot rolled steel sheet to improve the magnetic properties. However, when it is less than 0.03 mass %, the effect of improving the magnetic properties is small, while when it exceeds 1.5 mass %, secondary recrystallization becomes unstable and the magnetic properties are deteriorated. Therefore, when Ni is added, it is preferably 0.03-1.5 mass %.

Also, each of Sn, Sb, Cu, P, Cr and Mo is an element useful to improve the magnetic properties. However, when each element is less than the aforementioned lower limit, the effect of improving the magnetic properties is small, while when it exceeds the above upper limit, the growth of secondary recrystallized grains is inhibited and the magnetic properties are deteriorated. Therefore, it is preferable to be included in the above range.

Moreover, the remainder other than the above ingredients is Fe and inevitable impurities incorporated in the production step.

The raw steel material may be a slab having a normal thickness of not less than 100 mm obtained by melting a steel of the above chemical composition through a usual refining process and then performing a continuous casting method or ingot making-blooming method or a thin slab having a thickness of not more than 100 mm obtained by a thin slab casting method. The slab having the normal thickness is generally heated and subjected to hot rolling, but may be subjected to hot rolling immediately after the continuous casting without heating. The thin slab may be subjected to hot rolling or may be carried to subsequent step straightly without the hot rolling.

Then, the hot rolled steel sheet or the cast slab not subjected to hot rolling is subjected to hot-band annealing, if necessary, subjected to one cold rolling or two or more cold rollings interposing intermediate annealings therebetween to a final thickness and to primary recrystallization annealing or a primary recrystallization annealing combined with decarburization annealing, coated on the steel sheet surface with an annealing separator and subjected to finish annealing for secondary recrystallization and refinement and further to application and baking of an insulation coating and flattening annealing combined with shape correction to thereby obtain a grain oriented electrical steel sheet. Moreover, the thickness of the grain oriented electrical steel sheet, or the final thickness in the cold rolling is not particularly defined but is preferably 0.15-0.35 mm from a viewpoint of decreasing the iron loss and ensuring good punching workability.

Then, the surface of the thus obtained steel sheet is subjected to a magnetic domain refining treatment by irradiating beams from a laser irradiation apparatus or an electron beam irradiation apparatus. A plurality of beam irradiation apparatuses are disposed in the widthwise direction of the steel sheet and beams are irradiated to plural regions of the steel sheet surface divided in the widthwise direction. In this case, it is necessary that a juncture between adjacent beam-irradiated regions is controlled to satisfy equations (1) and (2). Moreover, the width of beam irradiated by one of the beam irradiation apparatuses is not particularly limited, but is preferably not less than 150 mm, but not more than 1000 mm from a viewpoint of installation cost. When the coating is damaged by the beam irradiation, to ensure the insulation property and rust resistance, it is preferable to again apply an insulation coating at subsequent step.

Example 1

A steel sheet containing Si: 3 mass % and having a final thickness of 0.23 mm and a width of 1250 mm after cold rolling is subjected to a primary recrystallization annealing combined with a decarburization annealing, coated on its surface with an annealing separator composed mainly of MgO and subjected to a finish annealing including secondary recrystallization annealing and purification annealing to thereby obtain a grain oriented electrical steel sheet having a forsterite coating, and thereafter an insulation coating composed of 60 mass % of colloidal silica and aluminum phosphate is coated and baked by subjecting to a flattening annealing at a temperature of 800° C.

Then, the steel sheet is subjected to a magnetic domain refining treatment by irradiating continuous laser in a linear shape in a direction perpendicular to the rolling direction through four fiber lasers disposed in the widthwise direction or by irradiating electron beams at an interval of 0.20 mm in a dot sequence shape through eight electron beam irradiation apparatuses disposed in the widthwise direction. In this case, beam irradiating conditions are changed as shown in Tables 1-1 to 1-4. Furthermore, the nature of a juncture between beam-irradiated regions is changed by purposely and variously varying sets (targets) of displacement quantity (RD spacing α) in longitudinal direction (RD direction) and displacement quantity (TD spacing β) in widthwise direction at the juncture.

Thereafter, a specimen of 100 mm in width and 400 mm in length having the juncture in its widthwise central portion is cut out from the sheet to measure iron loss $W_{17/50}$ with a single sheet tester.

Also, RD spacing α and TD spacing β at the juncture between beam-irradiated regions, beam spacing a and average width w of magnetic domain discontinuous part of the specimen used for the measurement of the iron loss are measured by the aforementioned methods.

The thus measured results are also shown in Tables 1-1 to 1-4. As seen from these results, deterioration quantity of iron loss $W_{17/50}$ is small and suppressed to not more than 0.01 W/kg in grain oriented electrical steel sheets in which nature of a juncture between beam-irradiated regions satisfies our conditions as compared to when there is no displacement in the juncture.

TABLE 1-1

| No. | Magnetic domain refining method | Beam irradiating conditions | | | | | Nature of juncture | | Invention range | | | Deterioration quantity of iron loss $W_{17/50}$ (W/kg) | Remarks |
| | | Beam output (W) | Beam diameter (mm) | Scanning rate (m/s) | Beam spacing a (mm) | w (μm) | RD spacing α (mm) | TD spacing β (mm) | Upper limit of α (mm) | Lower limit of β (mm) | Upper limit of β (mm) | | |
|---|---|---|---|---|---|---|---|---|---|---|---|---|---|
| 1 | Laser irradiation (continuous) | 120 | 0.48 | 20 | 3 | 201 | 1.1 | 0.0 | 0.9 | −6.6 | 4.0 | 0.020 | Comparative Example |
| 2 | Laser irradiation (continuous) | 120 | 0.48 | 20 | 3 | 205 | 0.6 | −7.5 | 0.9 | −6.3 | 4.0 | 0.015 | Comparative Example |
| 3 | Laser irradiation (continuous) | 120 | 0.48 | 20 | 3 | 204 | 0.5 | −6.0 | 0.9 | −6.3 | 4.0 | 0.010 | Our Example |

TABLE 1-1-continued

| | | Beam irradiating conditions | | | | Nature of juncture | | Invention range | | | Deterioration | |
| | Magnetic | | | | | RD | TD | Upper limit of α | Lower limit of β | Upper limit of β | quantity of | |
| No. | domain refining method | Beam output (W) | Beam diameter (mm) | Scanning rate (m/s) | Beam spacing a (mm) | w (μm) | spacing α (mm) | spacing β (mm) | (mm) | (mm) | (mm) | iron loss $W_{17/50}$ (W/kg) | Remarks |
|---|---|---|---|---|---|---|---|---|---|---|---|---|---|
| 4 | Laser irradiation (continuous) | 120 | 0.48 | 20 | 3 | 203 | 0.0 | 3.8 | 0.9 | −6.0 | 4.0 | 0.005 | Our Example |
| 5 | Laser irradiation (continuous) | 120 | 0.48 | 20 | 3 | 203 | 0.0 | 4.2 | 0.9 | −6.0 | 4.0 | 0.020 | Comparative Example |
| 6 | Laser irradiation (continuous) | 150 | 0.48 | 20 | 4 | 218 | 1.5 | 3.0 | 1.2 | −7.7 | 4.0 | 0.015 | Comparative Example |
| 7 | Laser irradiation (continuous) | 150 | 0.48 | 20 | 4 | 219 | 1.1 | −7.8 | 1.2 | −7.5 | 4.0 | 0.015 | Comparative Example |
| 8 | Laser irradiation (continuous) | 150 | 0.48 | 20 | 4 | 217 | 0.0 | −6.8 | 1.2 | −7.0 | 4.0 | 0.010 | Our Example |
| 9 | Laser irradiation (continuous) | 150 | 0.48 | 20 | 4 | 219 | 0.0 | 3.4 | 1.2 | −6.9 | 4.0 | 0.010 | Our Example |
| 10 | Laser irradiation (continuous) | 150 | 0.48 | 20 | 4 | 215 | 0.0 | 4.1 | 1.2 | −7.0 | 3.9 | 0.020 | Comparative Example |
| 11 | Laser irradiation (continuous) | 150 | 0.32 | 20 | 5 | 208 | 1.3 | 4.5 | 1.5 | −9.0 | 3.8 | 0.025 | Comparative Example |
| 12 | Laser irradiation (continuous) | 150 | 0.32 | 20 | 5 | 206 | 0.8 | 3.5 | 1.5 | −8.8 | 3.8 | 0.010 | Our Example |
| 13 | Laser irradiation (continuous) | 150 | 0.32 | 20 | 5 | 207 | 0.2 | 3.1 | 1.5 | −8.5 | 3.8 | 0.005 | Our Example |
| 14 | Laser irradiation (continuous) | 150 | 0.32 | 20 | 5 | 203 | 0.0 | −6.5 | 1.5 | −8.4 | 3.8 | 0.005 | Our Example |
| 15 | Laser irradiation (continuous) | 150 | 0.32 | 20 | 5 | 208 | 0.0 | −8.0 | 1.5 | −8.3 | 3.8 | 0.010 | Our Example |
| 16 | Laser irradiation (continuous) | 200 | 0.48 | 20 | 8 | 263 | 0.0 | −11.2 | 2.4 | −10.8 | 3.6 | 0.020 | Comparative Example |
| 17 | Laser irradiation (continuous) | 200 | 0.48 | 20 | 8 | 262 | 0.0 | −10.5 | 2.4 | −10.9 | 3.6 | 0.010 | Our Example |
| 18 | Laser irradiation (continuous) | 200 | 0.48 | 20 | 8 | 259 | 0.2 | 2.1 | 2.4 | −11.0 | 3.6 | 0.005 | Our Example |
| 19 | Laser irradiation (continuous) | 200 | 0.48 | 20 | 8 | 271 | 2.0 | 4.0 | 2.4 | −11.7 | 3.6 | 0.025 | Comparative Example |
| 20 | Laser irradiation (continuous) | 200 | 0.48 | 20 | 8 | 263 | 2.6 | 0.0 | 2.4 | −12.1 | 3.6 | 0.015 | Comparative Example |
| 21 | Laser irradiation (continuous) | 200 | 0.36 | 20 | 10 | 242 | 3.4 | −12.3 | 3.0 | −15.4 | 3.3 | 0.020 | Comparative Example |
| 22 | Laser irradiation (continuous) | 200 | 0.36 | 20 | 10 | 251 | 2.8 | −11.8 | 3.0 | −14.9 | 3.3 | 0.010 | Our Example |
| 23 | Laser irradiation (continuous) | 200 | 0.36 | 20 | 10 | 242 | 1.5 | 1.8 | 3.0 | −14.4 | 3.3 | 0.005 | Our Example |
| 24 | Laser irradiation (continuous) | 200 | 0.36 | 20 | 10 | 244 | 0.2 | 2.6 | 3.0 | −13.7 | 3.3 | 0.010 | Our Example |
| 25 | Laser irradiation (continuous) | 200 | 0.36 | 20 | 10 | 245 | 0.0 | 3.5 | 3.0 | −13.6 | 3.3 | 0.015 | Comparative Example |

TABLE 1-2

| No. | Magnetic domain refining method | Beam irradiating condition | | | | Nature of juncture | | | Invention range | | | Deterioration quantity of iron loss $W_{17/50}$ (W/kg) | Remarks |
|---|---|---|---|---|---|---|---|---|---|---|---|---|---|
| | | Beam output (W) | Beam diameter (mm) | Scanning rate (m/s) | Beam spacing a (mm) | w (μm) | RD spacing α (mm) | TD spacing β (mm) | Upper limit of α (mm) | Lower limit of β (mm) | Upper limit of β (mm) | | |
| 26 | Laser irradiation (continuous) | 200 | 0.24 | 20 | 12 | 201 | 0.0 | −17.5 | 3.6 | −16.9 | 2.8 | 0.015 | Comparative Example |
| 27 | Laser irradiation (continuous) | 200 | 0.24 | 20 | 12 | 205 | 0.0 | −16.2 | 3.6 | −16.8 | 2.9 | 0.010 | Our Example |
| 28 | Laser irradiation (continuous) | 200 | 0.24 | 20 | 12 | 204 | 1.7 | −8.5 | 3.6 | −17.7 | 2.9 | 0.005 | Our Example |
| 29 | Laser irradiation (continuous) | 200 | 0.24 | 20 | 12 | 203 | 3.3 | 0.0 | 3.6 | −18.5 | 2.9 | 0.010 | Our Example |
| 30 | Laser irradiation (continuous) | 200 | 0.24 | 20 | 12 | 203 | 3.8 | 0.5 | 3.6 | −18.7 | 2.9 | 0.015 | Comparative Example |
| 31 | Laser irradiation (continuous) | 180 | 0.48 | 20 | 4 | 252 | 0.0 | −6.5 | 1.2 | −6.3 | 4.1 | 0.015 | Comparative Example |
| 32 | Laser irradiation (continuous) | 180 | 0.48 | 20 | 4 | 253 | 0.0 | −6.1 | 1.2 | −6.2 | 4.1 | 0.010 | Our Example |
| 33 | Laser irradiation (continuous) | 180 | 0.48 | 20 | 4 | 256 | 0.0 | 3.5 | 1.2 | −6.2 | 4.1 | 0.010 | Our Example |
| 34 | Laser irradiation (continuous) | 180 | 0.48 | 20 | 4 | 262 | 0.0 | 3.9 | 1.2 | −6.1 | 4.1 | 0.010 | Our Example |
| 35 | Laser irradiation (continuous) | 180 | 0.48 | 20 | 4 | 258 | 0.0 | 4.2 | 1.2 | −6.1 | 4.1 | 0.015 | Comparative Example |
| 36 | Laser irradiation (continuous) | 120 | 0.24 | 20 | 4 | 184 | 0.0 | −9.5 | 1.2 | −7.6 | 3.8 | 0.020 | Comparative Example |
| 37 | Laser irradiation (continuous) | 120 | 0.24 | 20 | 4 | 189 | 0.0 | −8.1 | 1.2 | −7.5 | 3.8 | 0.015 | Comparative Example |
| 38 | Laser irradiation (continuous) | 120 | 0.24 | 20 | 4 | 186 | 0.0 | −7.5 | 1.2 | −7.6 | 3.8 | 0.010 | Our Example |
| 39 | Laser irradiation (continuous) | 120 | 0.24 | 20 | 4 | 185 | 0.0 | −3.2 | 1.2 | −7.6 | 3.8 | 0.005 | Our Example |
| 40 | Laser irradiation (continuous) | 120 | 0.24 | 20 | 4 | 187 | 0.0 | −1.2 | 1.2 | −7.6 | 3.8 | 0.000 | Our Example |
| 41 | Laser irradiation (continuous) | 200 | 0.64 | 20 | 4 | 282 | 0.0 | 1.3 | 1.2 | −5.7 | 4.2 | 0.005 | Our Example |
| 42 | Laser irradiation (continuous) | 200 | 0.64 | 20 | 4 | 283 | 0.0 | 2.4 | 1.2 | −5.6 | 4.2 | 0.005 | Our Example |
| 43 | Laser irradiation (continuous) | 200 | 0.64 | 20 | 4 | 284 | 0.0 | 3.8 | 1.2 | −5.6 | 4.2 | 0.010 | Our Example |
| 44 | Laser irradiation (continuous) | 200 | 0.64 | 20 | 4 | 286 | 0.0 | 4.3 | 1.2 | −5.6 | 4.2 | 0.020 | Comparative Example |
| 45 | Laser irradiation (continuous) | 200 | 0.64 | 20 | 4 | 287 | 0.0 | 5.1 | 1.2 | −5.6 | 4.2 | 0.030 | Comparative Example |
| 46 | Laser irradiation (continuous) | 150 | 0.48 | 20 | 4 | 218 | 0.3 | 0.0 | 1.2 | −7.1 | 4.0 | 0.005 | Our Example |
| 47 | Laser irradiation (continuous) | 150 | 0.48 | 20 | 4 | 217 | 0.7 | 0.0 | 1.2 | −7.3 | 4.0 | 0.005 | Our Example |
| 48 | Laser irradiation (continuous) | 150 | 0.48 | 20 | 4 | 215 | 1.0 | 0.0 | 1.2 | −7.5 | 3.9 | 0.010 | Our Example |

TABLE 1-2-continued

| | | Beam irradiating condition | | | | Nature of juncture | | | Invention range | | | |
| | | | | | | | | | Upper | Lower | Upper | Deterioration |
| No. | Magnetic domain refining method | Beam output (W) | Beam diameter (mm) | Scanning rate (m/s) | Beam spacing a (mm) | w (μm) | RD spacing α (mm) | TD spacing β (mm) | limit of α (mm) | limit of β (mm) | limit of β (mm) | quantity of iron loss $W_{17/50}$ (W/kg) | Remarks |
|---|---|---|---|---|---|---|---|---|---|---|---|---|---|
| 49 | Laser irradiation (continuous) | 150 | 0.48 | 20 | 4 | 216 | 1.1 | 0.0 | 1.2 | −7.5 | 4.0 | 0.010 | Our Example |
| 50 | Laser irradiation (continuous) | 150 | 0.48 | 20 | 4 | 213 | 1.3 | 0.0 | 1.2 | −7.7 | 3.9 | 0.015 | Comparative Example |

TABLE 1-3

| | | Beam irradiating condition | | | | Nature of juncture | | | Invention range | | | |
| | | Beam | | | | | | | Upper | Lower | Upper | Deterioration |
| No. | Magnetic domain refining method | accelerating voltage (kV) | Beam current (mA) | Scanning rate (m/s) | Beam spacing a (mm) | w (μm) | RD spacing α (mm) | TD spacing β (mm) | limit of α (mm) | limit of β (mm) | limit of β (mm) | quantity of iron loss $W_{17/50}$ (W/kg) | Remarks |
|---|---|---|---|---|---|---|---|---|---|---|---|---|---|
| 51 | Electron beam irradiation (dot sequence) | 60 | 8.0 | 30 | 4 | 226 | 0.0 | −7.2 | 1.2 | −6.8 | 4.0 | 0.015 | Comparative Example |
| 52 | Electron beam irradiation (dot sequence) | 60 | 8.0 | 30 | 4 | 225 | 0.0 | −6.5 | 1.2 | −6.8 | 4.0 | 0.010 | Our Example |
| 53 | Electron beam irradiation (dot sequence) | 60 | 8.0 | 30 | 4 | 228 | 0.0 | −3.2 | 1.2 | −6.7 | 4.0 | 0.005 | Our Example |
| 54 | Electron beam irradiation (dot sequence) | 60 | 8.0 | 30 | 4 | 219 | 0.0 | 3.5 | 1.2 | −6.9 | 4.0 | 0.010 | Our Example |
| 55 | Electron beam irradiation (dot sequence) | 60 | 8.0 | 30 | 4 | 225 | 0.0 | 4.3 | 1.2 | −6.8 | 4.0 | 0.020 | Comparative Example |
| 56 | Electron beam irradiation (dot sequence) | 60 | 9.5 | 30 | 5 | 239 | 0.0 | −8.0 | 1.5 | −7.7 | 3.9 | 0.015 | Comparative Example |
| 57 | Electron beam irradiation (dot sequence) | 60 | 9.5 | 30 | 5 | 242 | 0.0 | −7.2 | 1.5 | −7.7 | 3.9 | 0.010 | Our Example |
| 58 | Electron beam irradiation (dot sequence) | 60 | 9.5 | 30 | 5 | 241 | 1.8 | 0.5 | 1.5 | −8.6 | 3.9 | 0.015 | Comparative Example |
| 59 | Electron beam irradiation (dot sequence) | 60 | 9.5 | 30 | 5 | 243 | 1.2 | 3.5 | 1.5 | −8.2 | 3.9 | 0.010 | Our Example |
| 60 | Electron beam irradiation (dot sequence) | 60 | 9.5 | 30 | 5 | 238 | 0.0 | 4.2 | 1.5 | −7.7 | 3.9 | 0.015 | Comparative Example |
| 61 | Electron beam irradiation (dot sequence) | 80 | 9.0 | 40 | 7 | 203 | 0.5 | −12.3 | 2.1 | −11.1 | 3.5 | 0.015 | Comparative Example |
| 62 | Electron beam irradiation (dot sequence) | 80 | 9.0 | 40 | 7 | 202 | 0.5 | −11.5 | 2.1 | −11.1 | 3.5 | 0.020 | Comparative Example |

TABLE 1-3-continued

| | | Beam irradiating condition | | | | Nature of juncture | | | Invention range | | | | |
| --- | --- | --- | --- | --- | --- | --- | --- | --- | --- | --- | --- | --- | --- |
| | | Beam | | | | | | | Upper | Lower | Upper | Deterioration | |
| No. | Magnetic domain refining method | accelerating voltage (kV) | Beam current (mA) | Scanning rate (m/s) | Beam spacing a (mm) | w (μm) | RD spacing α (mm) | TD spacing β (mm) | limit of α (mm) | limit of β (mm) | limit of β (mm) | quantity of iron loss $W_{17/50}$ (W/kg) | Remarks |
| 63 | Electron beam irradiation (dot sequence) | 80 | 9.0 | 40 | 7 | 204 | 0.5 | −10.5 | 2.1 | −11.1 | 3.5 | 0.005 | Our Example |
| 64 | Electron beam irradiation (dot sequence) | 80 | 9.0 | 40 | 7 | 202 | 2.0 | −8.5 | 2.1 | −11.9 | 3.5 | 0.005 | Our Example |
| 65 | Electron beam irradiation (dot sequence) | 80 | 9.0 | 40 | 7 | 202 | 2.5 | −4.2 | 2.1 | −12.1 | 3.5 | 0.015 | Comparative Example |
| 66 | Electron beam irradiation (dot sequence) | 80 | 11.0 | 40 | 12 | 251 | 0.0 | 1.0 | 3.6 | −15.9 | 3.0 | 0.000 | Our Example |
| 67 | Electron beam irradiation (dot sequence) | 80 | 11.0 | 40 | 12 | 253 | 3.5 | 2.5 | 3.6 | −17.6 | 3.0 | 0.010 | Our Example |
| 68 | Electron beam irradiation (dot sequence) | 80 | 11.0 | 40 | 12 | 256 | 0.0 | 3.5 | 3.6 | −15.8 | 3.1 | 0.015 | Comparative Example |
| 69 | Electron beam irradiation (dot sequence) | 80 | 11.0 | 40 | 12 | 254 | 0.0 | 4.0 | 3.6 | −15.8 | 3.1 | 0.020 | Comparative Example |
| 70 | Electron beam irradiation (dot sequence) | 80 | 11.0 | 40 | 12 | 252 | 4.0 | 2.5 | 3.6 | −17.9 | 3.0 | 0.015 | Comparative Example |

TABLE 1-4

| | | Beam irradiating condition | | | | Nature of juncture | | | Invention range | | | | |
| --- | --- | --- | --- | --- | --- | --- | --- | --- | --- | --- | --- | --- | --- |
| | | Beam | | | | | | | Upper | Lower | Upper | Deterioration | |
| No. | Magnetic domain refining method | accelerating voltage (kV) | Beam current (mA) | Scanning rate (m/s) | Beam spacing a (mm) | w (μm) | RD spacing α (mm) | TD spacing β (mm) | limit of α (mm) | limit of β (mm) | limit of β (mm) | quantity of iron loss $W_{17/50}$ (W/kg) | Remarks |
| 71 | Electron beam irradiation (dot sequence) | 80 | 12.0 | 40 | 15 | 278 | 1.5 | −20.0 | 4.5 | −19.7 | 2.7 | 0.015 | Comparative Example |
| 72 | Electron beam irradiation (dot sequence) | 80 | 12.0 | 40 | 15 | 274 | 1.5 | −19.0 | 4.5 | −19.8 | 2.7 | 0.010 | Our Example |
| 73 | Electron beam irradiation (dot sequence) | 80 | 12.0 | 40 | 15 | 279 | 3.0 | −10.0 | 4.5 | −20.4 | 2.7 | 0.005 | Our Example |
| 74 | Electron beam irradiation (dot sequence) | 80 | 12.0 | 40 | 15 | 280 | 4.0 | 2.0 | 4.5 | −20.9 | 2.7 | 0.005 | Our Example |
| 75 | Electron beam irradiation (dot sequence) | 80 | 12.0 | 40 | 15 | 280 | 4.7 | 3.0 | 4.5 | −21.3 | 2.7 | 0.025 | Comparative Example |
| 76 | Electron beam irradiation (dot sequence) | 80 | 6.0 | 40 | 4 | 187 | 0.5 | −8.0 | 1.2 | −7.8 | 3.8 | 0.015 | Comparative Example |

TABLE 1-4-continued

| | | Beam irradiating condition | | | | Nature of juncture | | Invention range | | | | |
|---|---|---|---|---|---|---|---|---|---|---|---|---|
| | | Beam | | | | | | Upper | Lower | Upper | Deterioration | |
| No. | Magnetic domain refining method | Beam accelerating voltage (kV) | Beam current (mA) | Scanning rate (m/s) | Beam spacing a (mm) | w (μm) | RD spacing α (mm) | TD spacing β (mm) | limit of α (mm) | limit of β (mm) | limit of β (mm) | quantity of iron loss $W_{17/50}$ (W/kg) | Remarks |
| 77 | Electron beam irradiation (dot sequence) | 80 | 6.0 | 40 | 4 | 184 | 0.5 | −7.5 | 1.2 | −7.9 | 3.8 | 0.010 | Our Example |
| 78 | Electron beam irradiation (dot sequence) | 80 | 6.0 | 40 | 4 | 189 | 0.5 | −6.0 | 1.2 | −7.8 | 3.8 | 0.005 | Our Example |
| 79 | Electron beam irradiation (dot sequence) | 80 | 6.0 | 40 | 4 | 185 | 0.5 | −4.0 | 1.2 | −7.9 | 3.8 | 0.005 | Our Example |
| 80 | Electron beam irradiation (dot sequence) | 80 | 6.0 | 40 | 4 | 184 | 0.5 | −2.0 | 1.2 | −7.9 | 3.8 | 0.000 | Our Example |
| 81 | Electron beam irradiation (dot sequence) | 40 | 12.5 | 30 | 4 | 283 | 1.0 | 1.5 | 1.2 | −6.1 | 4.2 | 0.005 | Our Example |
| 82 | Electron beam irradiation (dot sequence) | 40 | 12.5 | 30 | 4 | 287 | 1.0 | 3.0 | 1.2 | −6.1 | 4.2 | 0.010 | Our Example |
| 83 | Electron beam irradiation (dot sequence) | 40 | 12.5 | 30 | 4 | 284 | 1.0 | 4.0 | 1.2 | −6.1 | 4.2 | 0.010 | Our Example |
| 84 | Electron beam irradiation (dot sequence) | 40 | 12.5 | 30 | 4 | 289 | 1.0 | 4.5 | 1.2 | −6.0 | 4.2 | 0.015 | Comparative Example |
| 85 | Electron beam irradiation (dot sequence) | 40 | 12.5 | 30 | 4 | 284 | 1.0 | 7.0 | 1.2 | −6.1 | 4.2 | 0.025 | Comparative Example |
| 86 | Electron beam irradiation (dot sequence) | 150 | 7.5 | 60 | 7 | 204 | 1.5 | −13.0 | 2.1 | −12.1 | 3.5 | 0.015 | Comparative Example |
| 87 | Electron beam irradiation (dot sequence) | 150 | 7.5 | 60 | 7 | 203 | 2.5 | −11.5 | 2.1 | −12.1 | 3.5 | 0.020 | Comparative Example |
| 88 | Electron beam irradiation (dot sequence) | 150 | 7.5 | 60 | 7 | 205 | 1.5 | 0.5 | 2.1 | −12.1 | 3.5 | 0.000 | Our Example |
| 89 | Electron beam irradiation (dot sequence) | 150 | 7.5 | 60 | 7 | 201 | 1.5 | 3.0 | 2.1 | −12.1 | 3.5 | 0.010 | Our Example |
| 90 | Electron beam irradiation (dot sequence) | 150 | 7.5 | 60 | 7 | 205 | 1.5 | 3.8 | 2.1 | −12.1 | 3.5 | 0.020 | Comparative Example |

Example 2

A grain oriented electrical steel sheet having a final thickness of 0.23 mm, a width of 1250 mm and a coil length of 5000 m after formation of an insulation coating is subjected to a magnetic domain refining treatment by irradiating electron beams through six electron beam irradiation apparatuses disposed in the widthwise direction. In this case, electron beams are irradiated by changing target β value so as to render TD spacing β at a juncture between beam-irradiated regions into −5 mm, −3 mm, 0 mm and 3 mm.

Thereafter, 51 specimens in total are cut out from the product coil at an interval of 100 m to measure TD spacing β at a juncture between beam-irradiated regions, and maximum value and minimum value of the measured TD spacings β in the 51 specimens are shown in Table 2. As seen from these results, when beams are irradiated by setting a target value of TD spacing β to −3 to 0 mm, the range of resulting TD spacing β can be displaced to a minus side (overlapping side) where the deterioration of iron loss is small. Hence, beam irradiation can be performed under conditions that iron loss property is good even if the irradiation conditions are varied somewhat.

TABLE 2

| No. | Target setting value of TD spacing β (mm) | Resulting value of TD spacing β in 51 specimens | | Remarks |
| | | Minimum value (mm) | Maximum value (mm) | |
| --- | --- | --- | --- | --- |
| 1 | −5 | −12.3 | −1.3 | Comparative Example |
| 2 | −3 | −5.6 | 0.3 | Acceptable Example |
| 3 | 0 | −3.2 | 1.2 | Acceptable Example |
| 4 | 3 | −0.5 | 5.9 | Comparative Example |

The invention claimed is:

1. A grain oriented electrical steel sheet having a plurality of beam-irradiated regions formed by performing laser irradiation or electron beam irradiation onto a steel sheet surface in a widthwise direction of the steel sheet to introduce continued strain in a linear shape or in a dot sequence shape at an angle of not more than 30° with respect to the widthwise direction thereinto, wherein a juncture between the beam-irradiated regions satisfies equations (1) and (2):

$$0 \leq \alpha \leq 0.3 \times a \quad (1)$$

$$-1.2 \times a + 0.02 \times w - 0.5 \times \alpha - 6.5 \leq \beta \leq -0.13 \times a - 200 \times (1/w) + 5.4 \quad (2)$$

wherein α: RD spacing (mm) at a juncture between beam-irradiated regions,
β: TD spacing (mm) at a juncture between beam-irradiated regions,
a: beam spacing (mm), and
w: average width of magnetic domain discontinuous part (μm),
wherein the magnetic domain discontinuous part is a portion where magnetic domain structures are locally disturbed by introduction of thermal strain through beam irradiation such that the magnetic domain structures parallel to a rolling direction are interrupted or become discontinuous, and
wherein α and β both cannot be 0 at the same time.

2. The method as claimed in claim 1, wherein a surface of the steel sheet is divided into plural regions in a widthwise direction of the sheet and subjected to a magnetic domain refining treatment by disposing a laser irradiation apparatus or an electron beam irradiation apparatus on each of the regions and irradiating beams to form a beam-irradiated region, and irradiation of beams is performed by setting a TD spacing β at a juncture between the beam-irradiated regions to −3 to 0 mm.

* * * * *